United States Patent
Hotsuta (10) Patent No.: US 12,224,637 B2
(45) Date of Patent: Feb. 11, 2025

(54) ROTARY ELECTRICAL MACHINE

(71) Applicant: DENSO CORPORATION, Kariya (JP)

(72) Inventor: Kouji Hotsuta, Kariya (JP)

(73) Assignee: DENSO CORPORATION, Kariya (JP)

( * ) Notice: Subject to any disclaimer, the term of this patent is extended or adjusted under 35 U.S.C. 154(b) by 239 days.

(21) Appl. No.: 18/084,958

(22) Filed: Dec. 20, 2022

(65) Prior Publication Data

US 2023/0124334 A1  Apr. 20, 2023

Related U.S. Application Data

(63) Continuation of application No. PCT/JP2021/025820, filed on Jul. 8, 2021.

(30) Foreign Application Priority Data

Jul. 14, 2020 (JP) .................................. 2020-120759

(51) Int. Cl.
| | |
|---|---|
| H02K 3/28 | (2006.01) |
| H02K 1/16 | (2006.01) |
| H02K 3/34 | (2006.01) |
| H02K 5/22 | (2006.01) |

(52) U.S. Cl.
CPC ............... *H02K 3/28* (2013.01); *H02K 1/16* (2013.01); *H02K 3/345* (2013.01); *H02K 5/225* (2013.01)

(58) Field of Classification Search
CPC .. H02K 1/16; H02K 3/18; H02K 3/28; H02K 3/345; H02K 3/522
See application file for complete search history.

(56) References Cited

U.S. PATENT DOCUMENTS

| | | | |
|---|---|---|---|
| 2010/0060100 A1* | 3/2010 | Urano | H02K 3/522 |
| | | | 310/216.115 |
| 2013/0002068 A1* | 1/2013 | Miyasaka | H02K 3/525 |
| | | | 310/71 |
| 2018/0083516 A1* | 3/2018 | Endo | H02K 15/0068 |

FOREIGN PATENT DOCUMENTS

JP  2007-6592  1/2007

* cited by examiner

*Primary Examiner* — Naishadh N Desai
(74) *Attorney, Agent, or Firm* — Nixon & Vanderhye P.C.

(57) ABSTRACT

A rotary electrical machine includes a stator core having a plurality of teeth, a plurality of windings having coils wound around the teeth, a plurality of coil terminals connected to the windings, a plurality of external connection terminals connected to the coil terminals and connectable to an external power supply terminal, and a plurality of terminal holding portions attached to the stator core and holding the coil terminals. The external connection terminal has a contacted portion that extends in a direction perpendicular to the axial direction and abuts against the contact portion of the coil terminal in the axial direction. A terminal holding portion holds the coil terminal so as to be relatively movable in the directions of approaching and separating from the contacted portion.

6 Claims, 7 Drawing Sheets

FIG. 9

US 12,224,637 B2

ROTARY ELECTRICAL MACHINE

CROSS REFERENCE TO RELATED APPLICATIONS

This application is a continuation application of International Patent Application No. PCT/JP2021/025820 filed on Jul. 8, 2021, which designated the U.S. and based on and claims the benefits of priority of Japanese Patent Application No. 2020-120759 filed on Jul. 14, 2020. The entire disclosure of all of the above applications is incorporated herein by reference.

TECHNICAL FIELD

The present disclosure relates to a rotary electrical machine.

BACKGROUND

In a rotary electrical machine, an insulator is provided with a protrusion that protrudes in an axial direction at an outer peripheral portion of a stator.

SUMMARY

The present disclosure provides a rotary electrical machine that is small in size in the axial direction and has good connection between a coil terminal and a terminal for external connection.

A rotary electrical machine of the present disclosure includes a stator core having a plurality of teeth, a plurality of windings having coils wound around the teeth, a plurality of coil terminals connected to the windings, a plurality of external connection terminals connected to the coil terminals and connectable to an external power supply terminal, and a plurality of terminal holding portions attached to the stator core and holding the coil terminals. When a direction parallel to a rotation axis of the rotary electrical machine is referred to as an axial direction, the external connection terminal has a contacted portion that extends in a direction perpendicular to the axial direction and contacts against the contact portion of the coil terminal in the axial direction. A terminal holding portion holds the coil terminal so as to be relatively movable in the directions of approaching and separating from the contacted portion.

BRIEF DESCRIPTION OF DRAWINGS

The above and other objects, features and advantages of the present disclosure will become more apparent from the following detailed description taken in conjunction with the accompanying drawings.

In the drawings.

DETAILED DESCRIPTION

In the rotary electrical machine in the assumable example, the insulator is provided with a protrusion projecting in an axial direction at an outer peripheral portion of a stator. One end of a connecting fitting extending in an axial direction is axially inserted into a bottomed hole of the protrusion. A connecting opening of a bearing holder is provided with a U-shaped base portion of an external lead-out pin extending in the axial direction. The other end of the connection fitting is axially inserted into the base portion of the external lead-out pin.

When a coil terminal connected to a winding is connected to a terminal for external connection by inserting it into a U-shaped base portion extending in the axial direction, there is a problem that the size of the rotary electrical machine in the axial direction becomes large. Further, there is a demand for an improvement for obtaining a good connection state between the coil terminal and the terminal for external connection. The present disclosure provides a rotary electrical machine that is small in size in the axial direction and has good connections between the coil terminal and the terminal for external connection.

A rotary electrical machine of the present disclosure includes a stator core having a plurality of teeth, a plurality of windings having coils wound around the teeth, a plurality of coil terminals connected to the windings, a plurality of external connection terminals connected to the coil terminals and connectable to an external power supply terminal, and a plurality of terminal holding portions attached to the stator core and holding the coil terminals. When a direction parallel to a rotation axis of the rotary electrical machine is referred to as an axial direction, the external connection terminal has a contacted portion that extends in a direction perpendicular to the axial direction and contacts against the contact portion of the coil terminal in the axial direction. A terminal holding portion holds the coil terminal so as to be relatively movable in the directions of approaching and separating from the contacted portion.

Since the coil terminal axially contacts against the contacted portion extending in the direction perpendicular to the axial direction, a space in the axial direction of the terminal connecting portion is reduced, compared to the conventional configuration in which the coil terminal is inserted into the U-shaped base portion extending in the axial direction. Therefore, the size of the rotary electrical machine in the axial direction is reduced. Further, when connecting the coil terminal to the contacted portion, it is possible to adjust the position of the coil terminal that the coil terminal reliably contacts the contacted portion. Therefore, it is possible to obtain a good connection state between the coil terminal and the external connection terminal.

Hereinafter, a plurality of embodiments of a motor as a rotary electrical machine will be described below with reference to the drawings. In the embodiments, components which are substantially similar to each other are denoted by the same reference numerals and redundant description thereof is omitted.

First Embodiment

Figure 1:
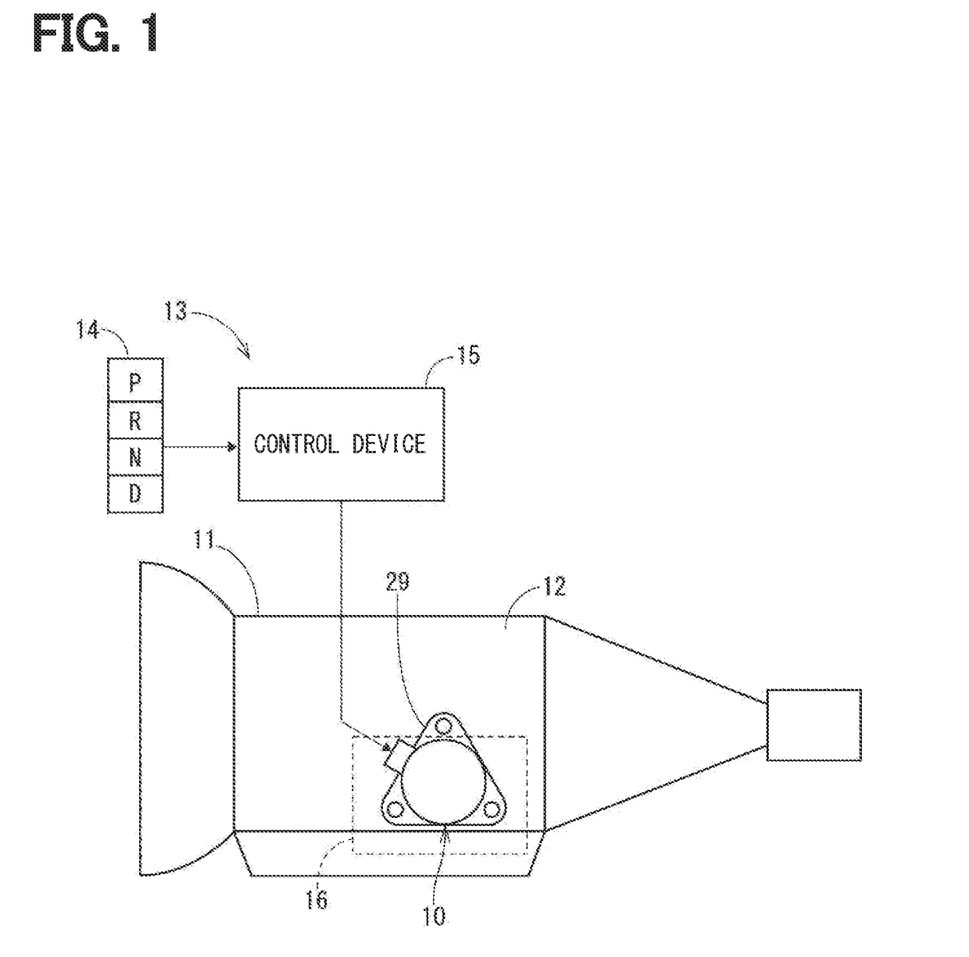
FIG. 1 is a schematic diagram illustrating a shift-by-wire system to which a rotary actuator with a motor of a first embodiment is applied.

As shown in FIG. 1, a motor 30 as an inner rotor type rotary electric machine of a first embodiment is provided in a rotary actuator (hereinafter, actuator) 10. The actuator 10 of the first embodiment is fixed to an outer wall of a case 12 of a vehicle transmission 11 and is used as a power source of a shift-by-wire system 13. In the shift-by-wire system 13, a control device 15 controls the actuator 10 in response to a command signal from a shift operation device 14 to operate a shift range switching mechanism 16 of the transmission 11 to switch a shift range.

(Actuator)

First, an overall configuration of the actuator 10 will be described with reference to FIG. 2. The actuator 10 includes a housing 20, a motor 30, and a speed reducer 40.

The housing 20 has a cup-shaped front housing 21 and a cup-shaped rear housing 22. An opening of the front housing 21 and an opening of the rear housing 22 are combined, and the front housing 21 and the rear housing 22 are fastened to each other by bolts 23. A bottomed cylindrical metal plate 24 is inserted into the front housing 21. The rear housing 22 has a tubular protrusion 28 that projects to an opposite side of the front housing 21. A bracket 29 is fixed to an outer wall of the rear housing 22. The actuator 10 is fixed to the case 12 (see FIG. 1) of the transmission 11 by using the bracket 29.

The motor 30 has a stator 31 and a rotor 34. The stator 31 has a stator core 32 fixed to the metal plate 24 by, for example, press fitting, and a winding 33 provided on the stator core 32. The rotor 34 has a rotary shaft 37 rotatably supported around a rotation axis AX1 by a motor side bearing 35 and a speed reducer side bearing 36, and a rotor core 38 fitted and fixed to an outside of the rotary shaft 37. The motor side bearing 35 is provided on the metal plate 24. The speed reducer side bearing 36 is provided on an output member 44, which will be described later.

The speed reducer 40 includes an eccentric shaft 41, a ring gear 42, an eccentric gear 43, an output member 44, and a transmission mechanism 45. The eccentric shaft 41 is provided on an eccentric axis AX2 that is eccentric with respect to the rotation axis AX1, and is integrally formed with the rotary shaft 37. The ring gear 42 is provided coaxially with the rotation axis AX1 and is fixed to the rear housing 22. The eccentric gear 43 has an external tooth portion 47 that meshes with an internal tooth portion 46 of the ring gear 42, and is supported by a bearing 48 provided on the eccentric shaft 41 so as to allow a planetary motion. The planetary motion is a motion that revolves around the rotation axis AX1 while rotating around the eccentric axis AX2. The rotation velocity of the eccentric gear 43 during planetary motion is changed with respect to the rotation speed of the rotary shaft 37.

The output member 44 is provided coaxially with the rotation axis AX1 and is rotatably supported by a bearing 49 provided in the rear housing 22. The transmission mechanism 45 is composed of an engaging protrusion 51 formed in the eccentric gear 43 and an engaging hole 52 formed in the output member 44 into which the engaging protrusion 51 is inserted, and transmits the rotation of the eccentric gear 43 around the eccentric axis AX2 to the output member 44.

In the actuator 10, a rotating magnetic field is generated by switching an energizing phase of the winding 33, and the rotor 34 rotates under the magnetic attraction force or the reaction force generated by the rotating magnetic field. When the eccentric shaft 41 rotates around the rotation axis AX1 together with the rotor 34, the eccentric gear 43 makes a planetary motion, and the rotation of the eccentric gear 43 decelerated with respect to the rotation of the rotor 34 is output from the output member 44 to the outside.

(Stator)

Next, the stator 31 and its wiring will be described with reference to FIGS. 2 to 7. In the following description, a direction parallel to a rotation axis AX1 is simply described as "axial direction", a direction around the rotation axis AX1 is simply described as "circumferential direction", and a direction orthogonal to the rotation axis AX1 is simply described as "radial direction". Further, a portion outside the component of the actuator 10 is referred to as "outside".

Figure 2:
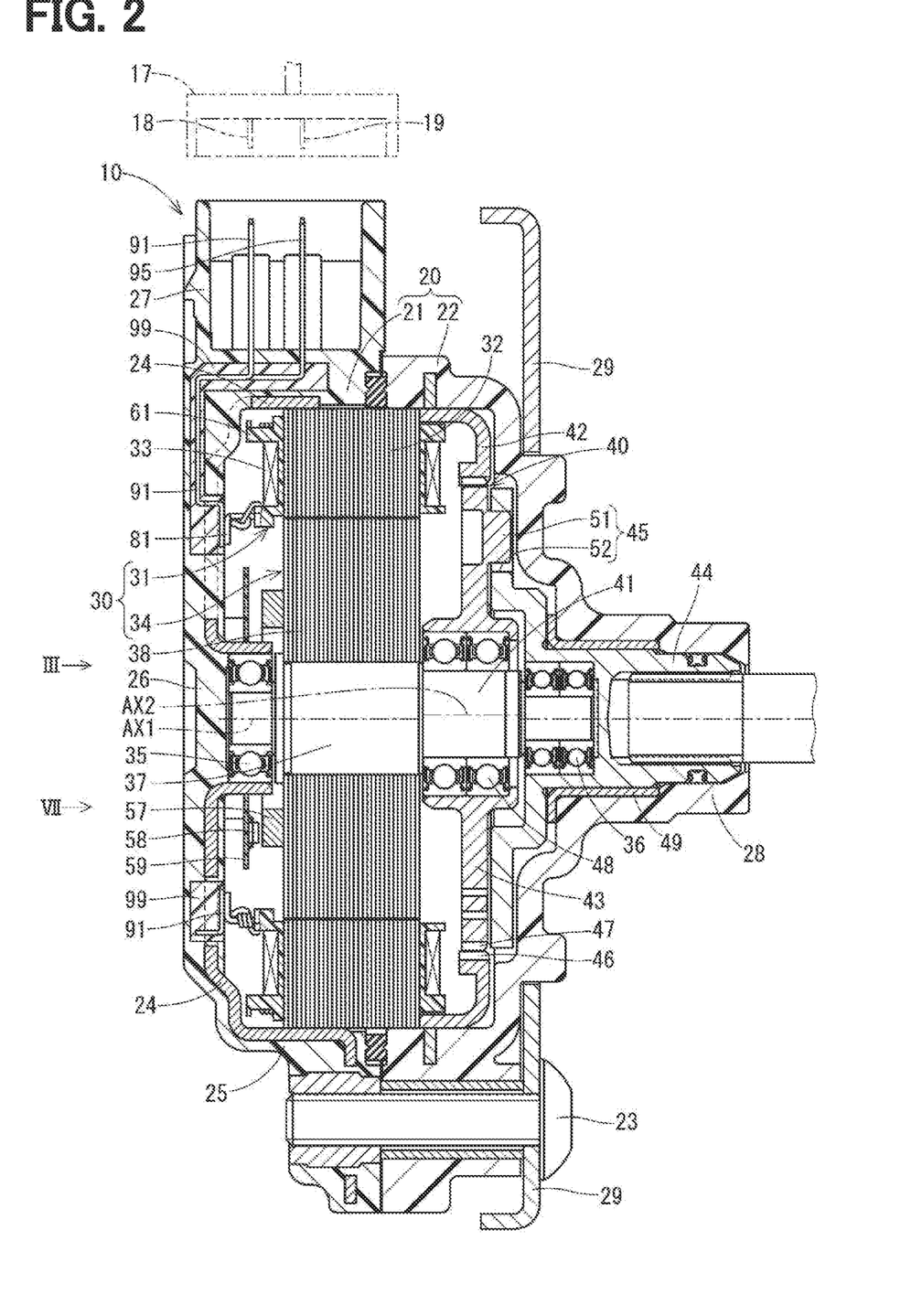
FIG. 2 is a cross-sectional view of the rotary actuator of FIG. 1.
Figure 3:
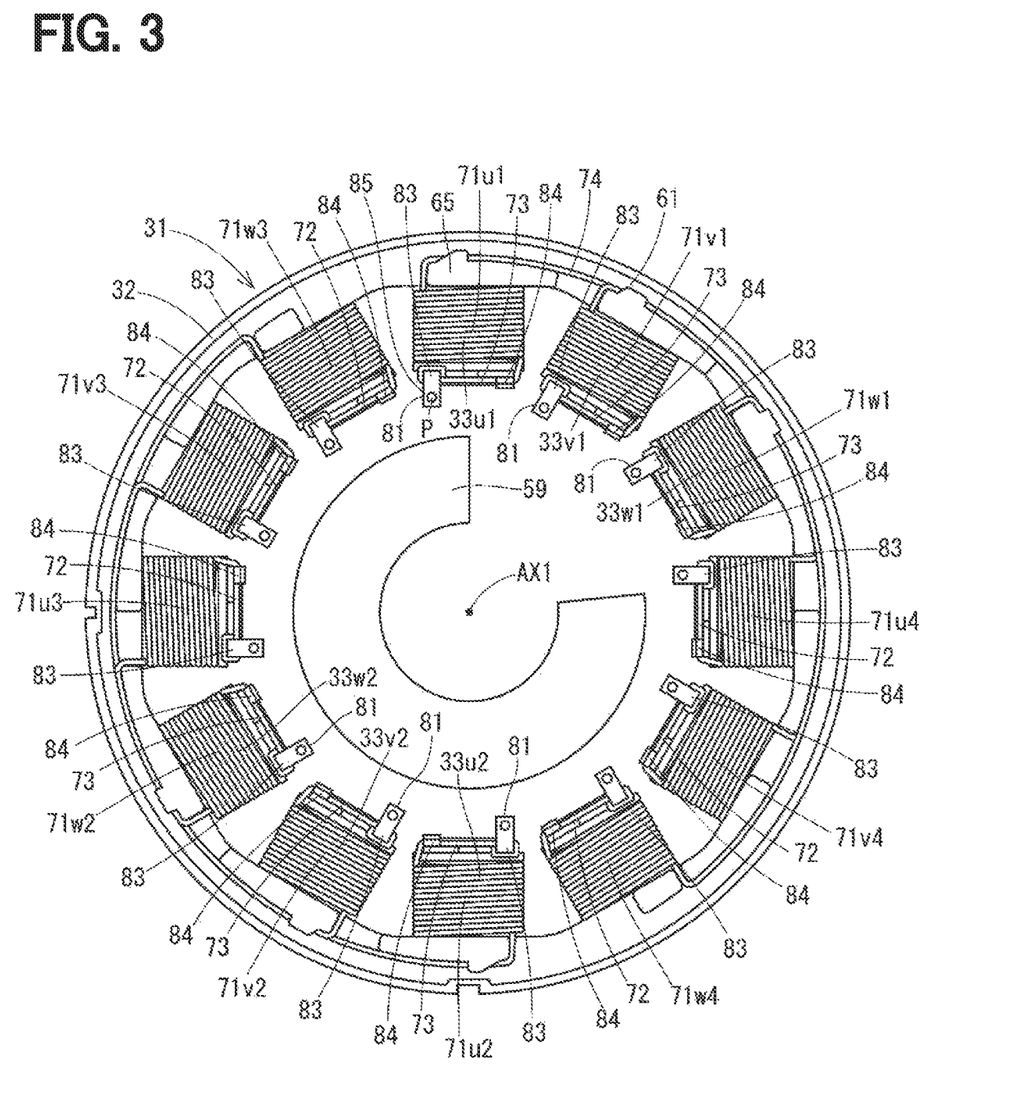
FIG. 3 is a view of a stator and a control board of FIG. 2 as viewed from a direction of arrow III.

As shown in FIGS. 2 and 3, the stator 31 includes a stator core 32, a plurality of windings 33, an insulator 61 interposed between the stator core 32 and the windings 33, and a plurality of coil terminals 81 connected to the windings 33.

The stator core 32 is composed of a plurality of metal plates laminated in the axial direction. The stator core 32 has an annular yoke 55 fixed to an inner wall of the tubular portion 25 of the front housing 21, and a plurality of teeth 56 formed so as to project radially inward from the yoke 55.

Figure 4:
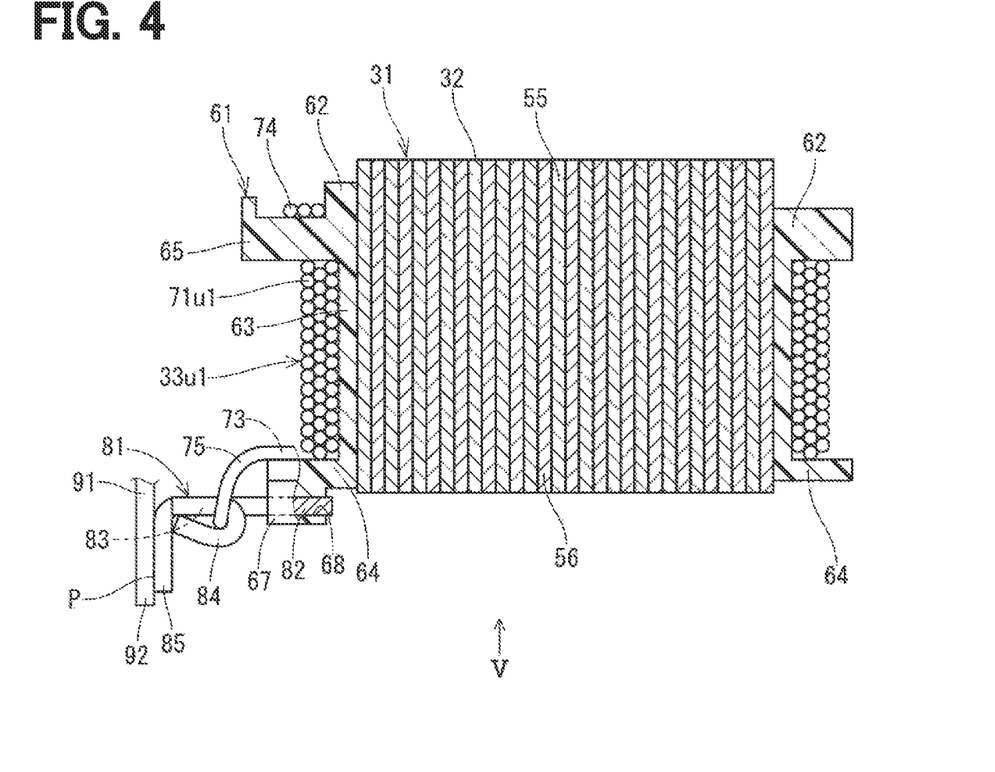
FIG. 4 is an enlarged view of a main part of the stator of FIG. 2.
Figure 5:
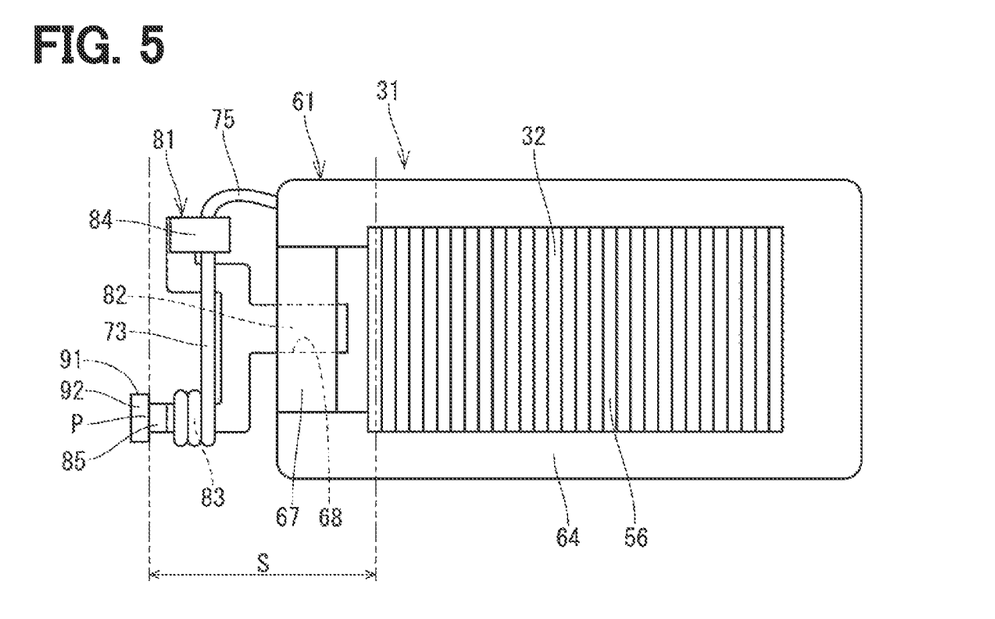
FIG. 5 is a view of the stator of FIG. 4 as viewed from a direction of arrow V.

As shown in FIGS. 3 to 5, the insulator 61 includes a yoke insulating portion 62 provided on both axial ends of the yoke 55 and an inner wall of the yoke 55 on the inner side in the radial direction, a tooth insulating portion 63 provided on a portion around the teeth 56 (that is, other than a tip surface of the teeth 56), and a flange portion 64 provided so as to protrude in the axial direction and the circumferential direction from the tooth tip side of the tooth insulating portion 63. The insulator 61 is assembled to the stator core 32.

Figure 6:
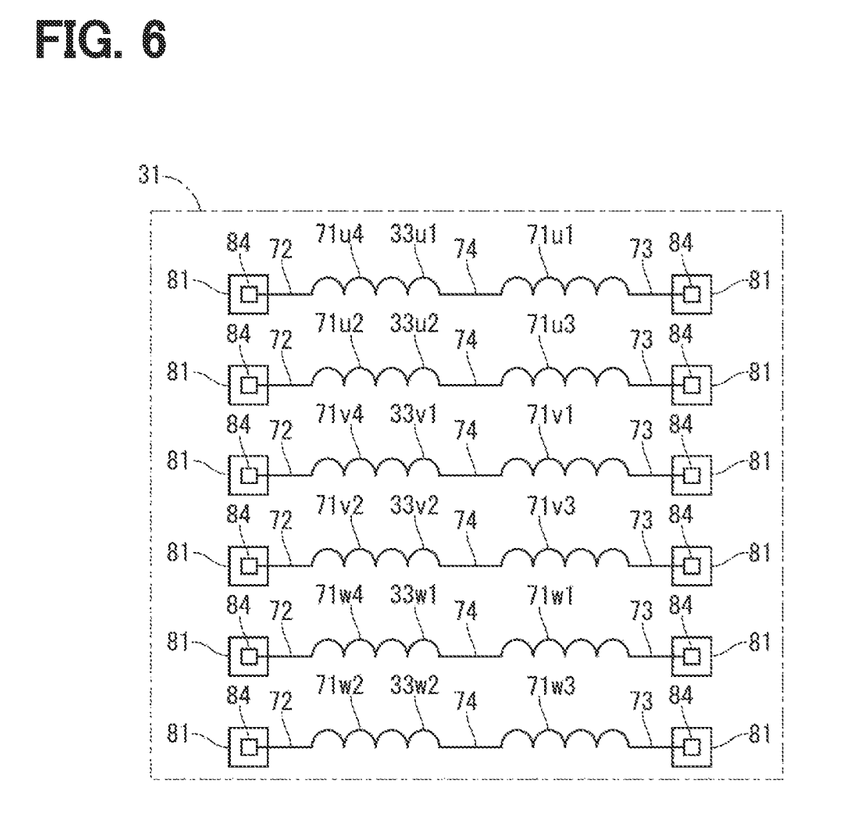
FIG. 6 is a diagram schematically showing windings and coil terminals of FIG. 3.
Figure 7:
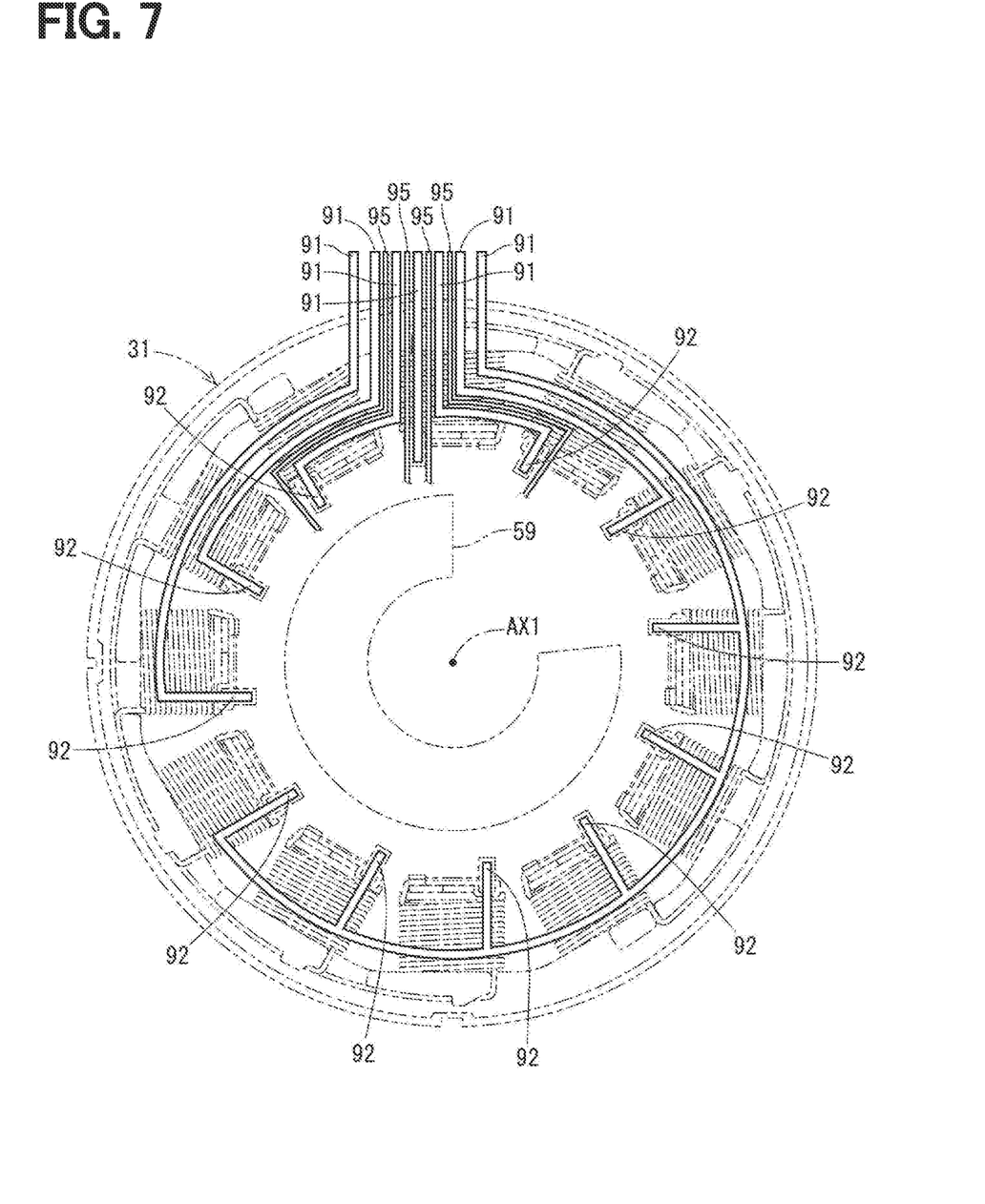
FIG. 7 is a view of the stator, motor terminal, and sensor terminal of FIG. 2 as viewed from a direction of arrow VII.

As shown in FIGS. 3 and 6, the multiple windings 33 include U-phase windings $33u1$ and $33u2$, V-phase windings $33v1$ and $33v2$, and W-phase windings $33w1$ and $33w2$. U-phase winding $33u1$, V-phase winding $33v1$ and W-phase winding $33w1$ constitute a winding set in a first system, and U-phase winding $33u2$, V-phase winding $33v2$ and W-phase winding $33w2$ constitute a winding set in a second system. The winding 33 is made redundant by providing two systems. Hereinafter, when each winding is not distinguished, it is simply described as "winding 33".

The winding 33 has a coil 71 wound around the tooth 56, that is, around the tooth insulating portion 63 of the insulator 61. One winding 33 is composed of one electric wire, and has two coils 71 between one end portion 72 and the other end portion 73 thereof. A crossover line 74 is provided between the coils 71. That is, one winding 33 is provided over two teeth 56.

U-phase winding $33u1$ has coils $71u1$ and $71u4$, and U-phase winding $33u2$ has coils $71u2$ and $71u3$. V-phase winding $33v1$ has coils $71v1$ and $71v4$, and V-phase winding $33v2$ has coils $71v2$ and $71v3$. W-phase winding $33w1$ has coils $71w1$ and $71w4$, and W-phase winding $33w2$ has coils $71w2$ and $71w3$. In the first embodiment, twelve teeth 56 are provided, and one coil 71 is provided for each tooth 56. One winding 33 is the coil 71 for one phase.

As shown in FIGS. 2 to 4, the yoke insulating portion 62 has a protruding locking portion 65 protruding toward the bottom portion 26 side of the front housing 21. The locking portion 65 locks the crossover line 74. In the first embodiment, the locking portion 65 is integrally provided with the insulator 61.

As shown in FIGS. 2 and 3, the actuator 10 includes a magnet 57 provided on the rotor core 38, a magnetic sensor 58 that is an element for detecting the rotation position of the rotor 34 and detects the magnetism of the magnet 57, and a control board 59 on which the magnetic sensor 58 is mounted.

As shown in FIG. 2, the front housing 21 has a bottom portion 26, a tubular portion 25, and a connector portion 27 that form a resin main body portion. The connector portion 27 is formed on the outside of the tubular portion 25. An external connector 17 is detachably connected to the connector portion 27. The external connector 17 holds a power supply terminal 18 and a signal terminal 19.

As shown in FIGS. 2, 4, 5, and 7, the front housing 21 includes a plurality of motor terminals 91 that is connected to the coil terminal 81 and is as external connection terminals directly connectable to the external power supply terminal 18, and a plurality of sensor terminals 95 that are connected to the control board 59 and can be connected to the external signal terminal 19. The motor terminal 91 and the sensor terminal 95 are inserted into the main body of the front housing 21, and extend from the bottom portion 26 to the connector portion 27 through the tubular portion 25. In the first embodiment, the motor terminal 91 and the sensor terminal 95 are inserted into the front housing 21 while being held by a primary molded body 99.

As shown in FIGS. 2 to 5, a terminal holding portion 67 for holding the coil terminal 81 is provided in the flange portion 64 on the bottom portion 26 side of the front housing 21. In the first embodiment, the terminal holding portion 67 is provided integrally with the insulator 61.

The coil terminal 81 includes a held portion 82 held by the terminal holding portion 67, a winding holding portion 83 holding one end portion 72 or the other end portion 73 of the winding 33, a winding connection portion 84 electrically connected to the winding 33, and a contact portion 85 contacting and electrically connecting to the motor terminal 91. In the first embodiment, the winding holding portion 83 is provided integrally with the coil terminal 81.

The terminal holding portion 67 holds the coil terminal 81 so as to be relatively movable in the directions of approaching and separating from the held portion 82. Specifically, the terminal holding portion 67 has a fitting hole 68, and the held portion 82 of the coil terminal 81 is fitted into the fitting hole 68 by being intermediate-fitted or clearance-fitted. In the first embodiment, the fitting hole 68 penetrates in the axial direction, and the held portion 82 is formed to extend in the axial direction. For example, an external force or the like acts on the coil terminal 81 and the held portion 82 slides against the inner wall of the fitting hole 68. Therefore, the coil terminal 81 moves relative to the terminal holding portion 67 in the axial direction. When the external force is removed, the movement of the coil terminal 81 stops due to the frictional force between the held portion 82 and the inner wall of the fitting hole 68, and the coil terminal 81 is held by the terminal holding portion 67.

One coil terminal 81 is provided for each tooth 56. Of the twelve coil terminals 81, six coil terminals 81 are connected to one end portion 72, and the other six coil terminals 81 are connected to the other end portion 73.

The coil terminals 81 are provided at both ends of the winding 33, and two coil terminals 81 are provided for each phase of the winding. One end portion 72, which is a winding start portion of the winding 33, extends from the winding holding portion 83 to the tooth 56 through the winding connection portion 84. The other end portion 73, which is a winding end portion of the winding 33, extends from the tooth 56 to the winding holding portion 83 through the winding connection portion 84.

The motor terminal 91 has a contacted portion 92 that extends in a direction perpendicular to the axial direction and abuts against the contact portion 85 of the coil terminal 81 in the axial direction. The coil terminal 81 is directly connected to the motor terminal 91 without a connecting part such as a bus bar. In the first embodiment, a contact point P between the contact portion 85 and the contacted portion 92 is arranged radially inward of the stator core 32. The contact portion 85 and the contacted portion 92 are joined by welding. Hereinafter, the connecting portion between the contact portion 85 and the contacted portion 92 is referred to as a "welded portion".

The winding holding portion 83 and the winding connection portion 84 are arranged radially inward of the coil 71, and the welded portion is arranged radially inward of the tips of the teeth of the stator core 32. Specifically, as shown in FIGS. 4 and 5, the winding holding portion 83 and the winding connection portion 84 are formed to extend from the held portion 82 toward the bottom portion 26 in the axial direction. The contact portion 85 is formed to extend radially inward from the tip of the winding holding portion 83. In the first embodiment, the winding holding portion 83 and the winding connection portion 84 are branched from the held portion 82 respectively.

The winding 33 is manufactured by nozzle winding. Specifically, the electric wire is entwined around the winding holding portion 83 and passed through the winding connection portion 84, and then wound around the first tooth insulating portion 63. Subsequently, after the electric wire pulled out from the first tooth insulating portion 63 is engaged with the locking portion 65, the electric wire is wound around the second tooth insulating portion 63. Finally, the electric wire pulled out from the second tooth insulating portion 63 is passed through another winding connection portion 84 different from the winding connection portion 84, and then entwined with the winding holding portion 83. The winding connection portion 84 and the winding 33 are connected by fusing or the like, for example.

As described above, the winding work of the electric wire is performed across a plurality of slots. When using the locking portion 65 arranged on the outer peripheral portion of the stator 31 and the winding holding portion 83 and the winding connection portion 84 arranged on the inner peripheral portion, complete alignment winding is realized by setting the number of winding layers of the wire to the tooth insulating portion 63 to be an odd number. The first and third layers of the winding 33 are wound from the radially inner side to the outer side, and the second layer of the winding 33 is wound from the radially outer side to the inner side.

Figure 8:
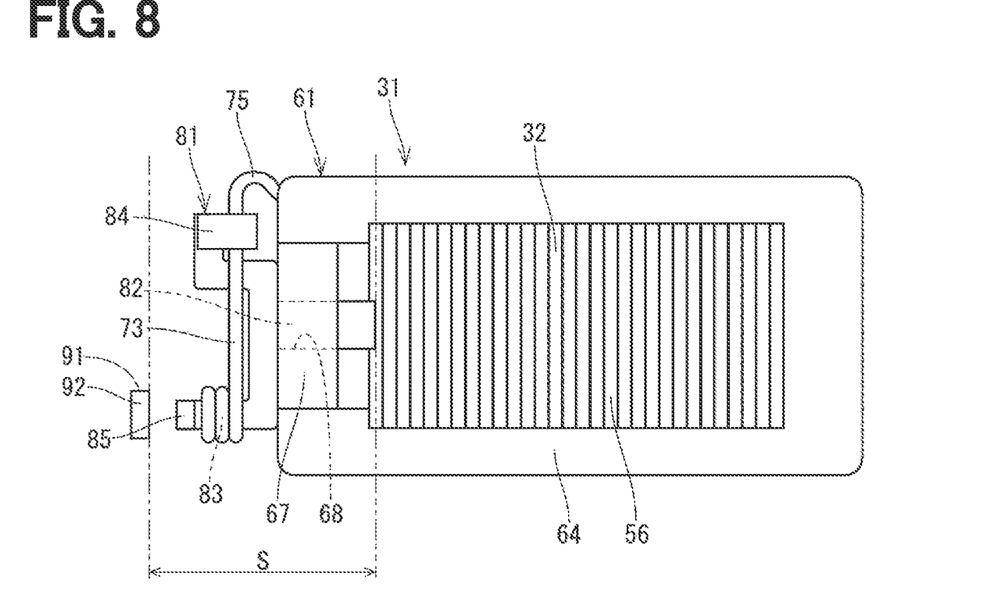
FIG. 8 is a diagram corresponding to FIG. 5, showing a state in which a coil terminal is farthest from a motor terminal before the coil terminal and the motor terminal are welded together.

The procedure for assembling the stator 31 to the front housing 21 is as follows. First, the stator core 32 is fixed to a cylindrical portion of the metal plate 24 by, for example, press fitting. Immediately after fixing the stator core 32 to the cylindrical portion, a slack portion 75 of the winding 33 from the coil 71 to the winding connection portion 84 has slack, as long as the winding 33 is held by the terminal holding portion 67 within a movable range S, which is from a position where the coil terminal 81 is farthest away from the contacted portion 92 as shown in FIG. 8 to a position where it contacts the contacted portion 92 as shown in FIG. 5. In the state shown in FIG. 8, there is a gap between the contact portion 85 and the contacted portion 92. Subsequently, the coil terminal 81 is moved until the contact portion 85 contacts the contacted portion 92. Finally, the contact portion 85 and the contacted portion 92 are welded.

(Effects)

As described above, in the first embodiment, the motor 30 includes the stator core 32 having a plurality of teeth 56, a plurality of windings 33 having coils 71 wound around the teeth 56, a plurality of coil terminals 81 connected to the windings 33, a plurality of motor terminals 91 connected to the coil terminals 81 and connectable to an external power supply terminal 18, and a plurality of terminal holding portions 67 attached to the stator core 32 and holding the coil terminals 81. The motor terminal 91 has a contacted portion 92 that extends in a direction perpendicular to the axial direction and abuts against the contact portion 85 of the coil terminal 81 in the axial direction. The terminal holding portion 67 holds the coil terminal 81 so as to be relatively movable in the directions of approaching and separating from the contacted portion 92.

Since the coil terminal 81 axially contacts against the contacted portion 92 extending in the direction perpendicular to the axial direction, the space in the axial direction of the terminal connecting portion is reduced, compared to the conventional configuration in which the coil terminal is inserted into the U-shaped base portion extending in the axial direction. Therefore, the axial size of the motor 30 is reduced. Further, when connecting the coil terminal 81 to the contacted portion 92, it is possible to adjust the position of the coil terminal 81 that the coil terminal 81 reliably contacts the contacted portion 92. Therefore, a good connection state between the coil terminal 81 and the motor terminal 91 can be obtained.

Further, in the first embodiment, the contact point P between the contact portion 85 and the contacted portion 92 is arranged radially inward of the coil 71. As a result, when the stator 31 is assembled to the front housing 21, the coil terminal 81 and the motor terminal 91 can be welded using the radially inner space of the stator core 32. Therefore, there is no need to provide special openings for welding. If the special opening is provided, for example, on the bottom side of the front housing 21, the size in the axial direction increases, and a member for closing the opening is required to ensure airtightness. In the first embodiment, there is no increase in size in the axial direction, and no member for closing the opening is required.

Further, in the first embodiment, the winding connection portion 84 is arranged radially inward of the coil 71 for example, coil 71$u$1). Therefore, by using the winding connection portion 84 located in the inner peripheral portion of the stator 31, the nozzle winding for continuously winding the winding 33 on two or more teeth 56 from the winding start to the winding end can be implemented. Therefore, it is possible to prevent the coil terminal 81 from protruding radially outward while adopting a nozzle winding that can be manufactured at low cost. Therefore, an inexpensive and compact stator 31 can be obtained.

Further, in the first embodiment, the one end portion 72 extends from the winding holding portion 83 through the winding connecting portion 84 to the teeth 56. The other end portion 73 extends from the teeth 56 to the winding holding portion 83 through the winding connecting portion 84. Therefore, by passing the electric wire through the winding connection portion 84 in the winding process of the winding wire 33, in the process of connecting the winding connection portion 84 and the winding 33, the winding 33 need not be manipulated, and only crimping needs to be performed, so that the connection process can be simplified.

In the first embodiment, the terminal holding portion 83 is provided integrally with the insulator 61. The coil terminal 81 is fitted in the fitting hole 68 of the terminal holding portion 67 with an intermediate fit or a clearance fit. Accordingly, the terminal holding portion 67 can hold the coil terminal 81 so as to move relatively to and away from the contacted portion 92 with a simple configuration.

Further, in the first embodiment, the slack portion 75 of the winding 33 from the coil 71 to the winding connection portion 84 has slack, as long as the winding 33 is held by the terminal holding portion 67 within a movable range S, which is from a position where the coil terminal 81 is farthest away from the contacted portion 92 to a position where it contacts the contacted portion 92. As a result, even if the coil terminal 81 is displaced in the axial direction when the coil terminal 81 and the motor terminal 91 are connected, the slackness of the slack portion 75 absorbs the displacement and no stress is generated in the winding 33. Therefore, disconnection of the winding 33 can be avoided.

Second Embodiment

Figure 9:
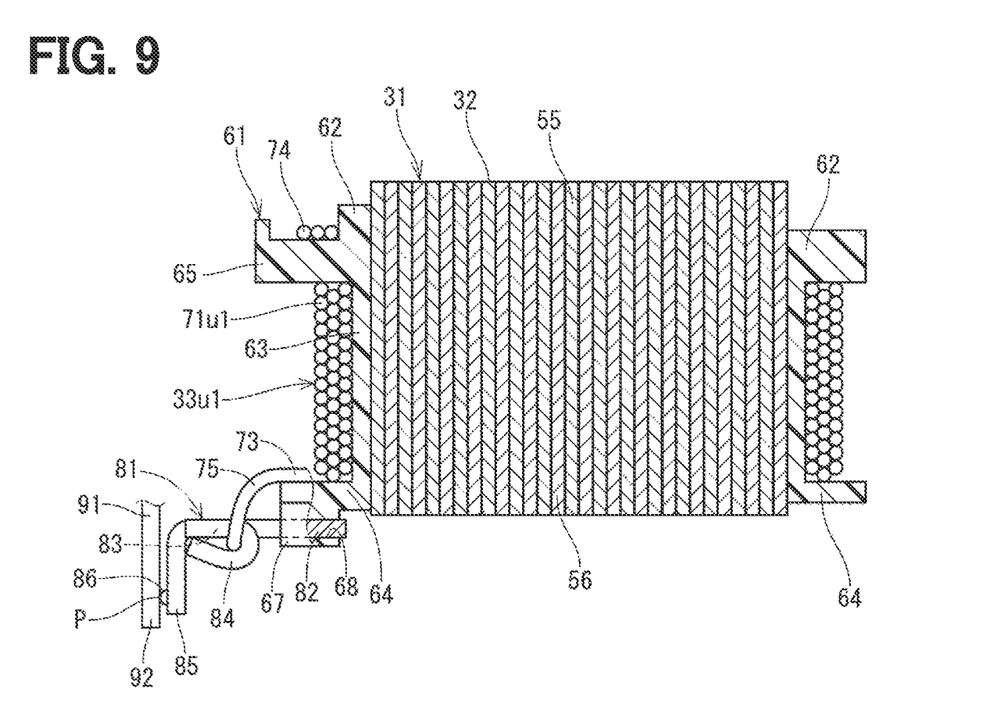
FIG. 9 is an enlarged view of a main part of the stator of a second embodiment, corresponding to FIG. 4 of the first embodiment.

In the second embodiment, as shown in FIG. 9, the surface of the contact portion 85 contacting against the contacted portion 92 is a convex curved surface 86. The convex curved surface 86 is, for example, the surface of a hemispherical protrusion formed so as to protrude toward the contacted portion 92 side. By having such a convex curved surface 86, the contact state between the contact portion 85 and the contacted portion 92 becomes a point contact. Even if the welding surface is tilted due to manufacturing variations of the members, the contact condition can be kept constant.

Other Embodiments

In other embodiments, the fitting hole of the terminal holding portion may be non-through. Also, the terminal holding portion is not limited to the hole, and may movably hold the coil terminal by, for example, a notch or a claw. Also, the terminal holding portion may be composed of a member different from the insulator.

In other embodiments, the extending direction of the winding holding portion is not limited to the axial direction, and may be the radial direction, the circumferential direction, or any other direction. Further, the winding holding portion is not limited to a portion branched from the portion of the coil terminal from the held portion to the winding connection portion, and may be provided between the held portion and the winding connection portion. Moreover, the winding holding portion is not limited to a part of the coil terminal, and may be a part of an insulator or other member, for example.

In other embodiments, the joining of the coil terminal and the motor terminal is not limited to welding, and may be performed by other methods such as pressure welding or soldering. In other embodiments, the connector portion of the front housing may be split into two or more.

In other embodiments, one winding may form a parallel circuit. That is, one end portion and the other end portion of the winding are connected to the first coil terminal, and the middle part between the two coils included in the winding is connected to the second coil terminal so that a first coil group and a second coil group included in one winding may be arranged in parallel.

In other embodiments, the number of teeth is not limited to 12 and may be other numbers. In other embodiments, the number of winding phases is not limited to three, and may be any other number. In other embodiments, the stator may be applied not only to motor but also to generator.

The present disclosure is not limited to the embodiments described above, and various modifications are possible within the scope of the present disclosure without departing from the spirit of the invention.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A rotary electrical machine, comprising:
    a stator core having a plurality of teeth;
    a plurality of windings having coils wound around the teeth;
    a plurality of coil terminals connected to the winding;
    a plurality of external connection terminals connected to the coil terminal and connectable to an external power supply terminal; and
    a plurality of terminal holding portions attached to the stator core and configured to hold the coil terminals; wherein
    when a direction parallel to a rotation axis of the rotary electrical machine is defined as an axial direction,
    the external connection terminal has a contacted portion that extends in a direction perpendicular to the axial direction and abuts against a contact portion of the coil terminal in the axial direction, and
    the terminal holding portion holds the coil terminal so as to be relatively movable in a direction of approaching and separating from the contacted portion.

2. The rotary electrical machine according to claim 1, wherein
    when a direction perpendicular to the rotation axis is defined as a radial direction, and
    a contact portion between the contact portion and the contacted portion is arranged radially inward of the stator core.

3. The rotary electrical machine according to claim 1, further comprising:
    an insulator interposed between the stator core and the winding, wherein
    the terminal holding portion is provided integrally with the insulator, and
    the coil terminal is fitted in a fitting hole of the terminal holding portion with an intermediate fit or a clearance fit.

4. The rotary electrical machine according to claim 1, wherein
    a surface on which one of the contact portion and the contacted portion contacts the other is a convex curved surface.

5. The rotary electrical machine according to claim 1, wherein
    the coil terminal has a winding connection portion connected to the winding, and
    a slack portion of the winding from the coil to the winding connection portion has slack, as long as the winding is held by the terminal holding portion within a movable range, which is from a position where the coil terminal is farthest away from the contacted portion to a position where it contacts the contacted portion.

6. The rotary electrical machine according to claim 2, wherein
    a surface on which one of the contact portion and the contacted portion contacts the other is a convex curved surface.

* * * * *